(12) United States Patent
Ikebe et al.

(10) Patent No.: US 7,047,546 B2
(45) Date of Patent: May 16, 2006

(54) DISC CARTRIDGE

(75) Inventors: Masaru Ikebe, Tokyo (JP); Kenji Hashizume, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/480,781

(22) PCT Filed: Jun. 27, 2002

(86) PCT No.: PCT/JP02/06529

§ 371 (c)(1),
(2), (4) Date: Dec. 15, 2003

(87) PCT Pub. No.: WO03/005364

PCT Pub. Date: Jan. 16, 2003

(65) Prior Publication Data

US 2004/0168183 A1    Aug. 26, 2004

(30) Foreign Application Priority Data

Jul. 4, 2001    (JP)    .............................. 2001-203224

(51) Int. Cl.
*G11B 23/03*    (2006.01)
(52) U.S. Cl. .................................... 720/727
(58) Field of Classification Search ................ 720/727, 720/738, 739, 740, 741, 742, 743, 744; 369/291
See application file for complete search history.

(56) References Cited

U.S. PATENT DOCUMENTS

| | | | |
|---|---|---|---|
| 5,537,389 A * | 7/1996 | Kuwa et al. ................. | 720/743 |
| 2001/0055270 A1* | 12/2001 | Obata et al. ................. | 369/291 |
| 2002/0031080 A1* | 3/2002 | Inoue .......................... | 369/291 |
| 2002/0075796 A1* | 6/2002 | Shiomi et al. ............... | 369/291 |
| 2002/0131361 A1* | 9/2002 | Oishi et al. .................. | 369/291 |
| 2003/0174640 A1* | 9/2003 | Iwaki et al. ................. | 369/291 |

FOREIGN PATENT DOCUMENTS

| | | |
|---|---|---|
| JP | A 11-176127 | 7/1999 |
| JP | A 2000-90626 | 3/2000 |
| JP | A 2000-90627 | 3/2000 |
| JP | A 2000-90628 | 3/2000 |
| JP | 2000113630 A * | 4/2000 |
| JP | A 2000-113630 | 4/2000 |

* cited by examiner

*Primary Examiner*—Tianjie Chen
(74) *Attorney, Agent, or Firm*—Oliff & Berridge, PLC.

(57) ABSTRACT

In a disc cartridge for an optical disc and the like, to increase stiffness in an opening for a record and reproduction mechanism. A disc cartridge 10 has an upper shell 12, a center frame 14, and a lower shell 16 clamped to one another. A center frame opening 20 and a lower shell opening 22 expose a recording surface of a recording medium contained between the center frame 14 and the upper shell 12 downwardly, and a reinforcing member 24 integrally couples the ends of the center frame opening 20, and a lower shell reinforcing member 26 integrally couples the ends of the lower shell opening 22.

4 Claims, 4 Drawing Sheets

DISC CARTRIDGE

This application is a 371 of PCT/JP02/06529 Jun. 27, 2002.

TECHNICAL FIELD

The present invention relates to a disc cartridge which rotatably contains a disc storage medium such as an optical disc and the like.

BACKGROUND ART

This type of disc cartridge, as disclosed in, for example, Japanese Patent Laid-Open Publication No. 2000-90626, comprises an upper half and a lower half which rotatably contain an optical disc in between, and a notch is formed in the front surface thereof so that a record and reproduction mechanism having a pickup portion and the like can enter when the disc cartridge is installed in a drive unit, and an opening and a drive opening are formed in the lower surface thereof continuously in a disc radial direction from the notch.

An internal shutter tightly closes the notch in the front surface, and the opening and the drive opening continuing from the notch, when the disc cartridge is not installed in the drive unit. The internal shutter is guided along the upper surface of the lower half.

In the above disc cartridge, since the opening and the drive opening are formed continuously from the front surface in the disc radial direction in a lower shell, stiffness decreases and warpage occurring in molding decreases flatness, so that there are problems that space for rotatably containing the disc does not have enough margin in a thickness direction, and it becomes difficult to smoothly guide the shutter.

Moreover, there is a problem that the above warpage makes dust occurring in the disc cartridge get into the drive unit.

Furthermore, material for an upper shell and the lower shell requires low abrasion, because a gap in a thickness direction between peripheral walls erected upward from the lower shell and erected downward from the upper shell guides the shutter, and the shutter slides along the peripheral walls.

However, it is very difficult that resin material for general purpose use combines low abrasion, high stiffness, and high heat resistance, so that there is a problem that stiffness and heat resistance of the whole disc cartridge cannot be improved without increase in material cost or decrease in moldability.

This invention has been made in view of the above conventional problems, and an object of the present invention is to provide a disc cartridge which has high strength, high moldability, and high resistance to warpage without increase in material cost.

Another object of the present invention is to provide a disc cartridge which improves stiffness and heat resistance on the whole.

The inventor has assiduously pursued his studies, and achieved the above objects by integrally coupling the front surface of the opening to the record and reproduction mechanism in the drive unit without interference to increase the whole stiffness.

In other words, the problems can be solved by the following present invention.

(1) A disc cartridge comprising an upper shell, a center frame, and a lower shell superposed on and coupled to each other in a thickness direction, wherein a disc container space between the upper shell and the center frame rotatably contains a disc recording medium, a center frame opening and a lower shell opening for recording and/or reproducing are formed in the approximately same shape at overlapping positions of the center frame and the lower shell, respectively, to expose a part of a signal recording area of the contained disc recording medium across inner and outer peripheries in a disc radial direction and to the outside of the lower shell in a disc thickness direction, and a reinforcing member is integrally provided in the center frame to couple both sides of the center frame opening in an outer edge of the center frame opening, and in a position separate from a surface of the contained disc recording medium on a lower shell side to an upper shell side in the thickness direction.

(2) The disc cartridge according to (1), wherein the reinforcing member has an L-shaped portion in cross section, the L-shaped portion comprising a peripheral wall erected in the thickness direction of the center frame, and a plane perpendicularly bent from an erected end of the peripheral wall.

(3) The disc cartridge according to (1) or (2), wherein an arc-shaped disc outer peripheral wall is erectly formed in a surface of the center frame on an upper shell side, and the reinforcing member is formed in an arc shape so as to be continued from the disc outer peripheral wall.

(4) The disc cartridge according to (3), wherein a shutter for opening and closing the center frame opening and the lower shell opening is movably contained between the center frame and the lower shell along a plane opposed to the center frame and the lower shell, and the disc outer peripheral wall and the reinforcing member also function as a guide for the shutter.

(5) A disc cartridge comprising an upper shell, a center frame, and a lower shell superposed on and coupled to each other in a thickness direction, wherein a disc container space between the upper shell and the center frame rotatably contains a disc recording medium, a center frame opening and a lower shell opening for recording and/or reproducing are formed in the approximately same shape at overlapping positions of the center frame and the lower shell, respectively, to expose a part of a signal recording area of the contained disc recording medium across inner and outer peripheries in a disc radial direction and to an outside of the lower shell in a disc thickness direction, an arc-shaped disc outer peripheral wall is erectly formed in a surface of the center frame on an upper shell side, and an erected end of the disc outer peripheral wall makes contact with an inner surface of the upper shell to form the disc container space.

(6) A disc cartridge comprising an upper shell, a center frame, and a lower shell superposed on and coupled to each other in a thickness direction, wherein a disc container space between the upper shell and the center frame rotatably contains a disc recording medium, a center frame opening and a lower shell opening for recording and/or reproducing are formed in the approximately same shape at overlapping positions of the center frame and the lower shell, respectively, to expose a part of a signal recording area of the contained disc recording medium across inner and outer peripheries in a disc radial direction and to an outside of the lower shell in a disc thickness direction, an arc-shaped disc outer peripheral wall is erectly formed in a surface of the center frame on an upper shell side, the upper shell and the lower shell are clamped with making contact with each other at a position outside of the disc outer peripheral wall in the thickness direction, and the height of the arc-shaped disc outer peripheral wall is so designed that an end thereof is pressed against an inner surface of the upper shell by clamping force.

(7) A disc cartridge comprising an upper shell, a center frame, and a lower shell superposed on and coupled to each other in a thickness direction, wherein a disc container space between the upper shell and the center frame rotatably contains a disc recording medium, a center frame opening and a lower shell opening for recording and/or reproducing are formed in the approximately same shape at overlapping positions of the center frame and the lower shell, respectively, to expose a part of a signal recording area of the contained disc recording medium across inner and outer peripheries in a disc radial direction and to an outside of the lower shell in a disc thickness direction, a width of the center frame opening in a disc rotational direction is larger than that of the lower shell opening, and both ends of the center frame opening in a width direction are disposed outside of both ends of the lower shell opening in the width direction.

(8) A disc cartridge comprising an upper shell, a center frame, and a lower shell superposed on and coupled to each other in a thickness direction, wherein a disc container space between the upper shell and the center frame rotatably contains a disc recording medium, a center frame opening and a lower shell opening for recording and/or reproducing are formed in the approximately same shape at overlapping positions of the center frame and the lower shell, respectively, to expose a part of a signal recording area of the contained disc recording medium across inner and outer peripheries in a disc radial direction and to an outside of the lower shell in a disc thickness direction, at least an inner surface of the lower shell is made of material with low slide frictional resistance, and the upper shell is made of material having higher heat resistance and stiffness than material for the inner surface of the lower shell.

(9) The disc cartridge according to (5) or (6), wherein a reinforcing member is integrally provided in the center frame to couple both sides of the center frame opening in an outer edge of the center frame opening, and in a position separate from a surface of the contained disc recording medium on a lower shell side to an upper shell side in the thickness direction, and the reinforcing member is formed in an arc shape so as to be continued to the disc outer peripheral wall.

(10) The disc cartridge according to (7) or (8), wherein a reinforcing member is integrally provided in the center frame to couple both sides of the center frame opening in an outer edge of the center frame opening, and in a position separate from a surface of the contained disc recording medium on a lower shell side to an upper shell side in the thickness direction.

(11) The disc cartridge according to (10), wherein an arc-shaped disc outer peripheral wall is erectly formed in the surface of the center frame on an upper shell side, and an erected end of the disc outer peripheral wall makes contact with an inner surface of the upper shell to form the disc container space, and the reinforcing member is formed in an arc shape so as to be continued from the disc outer peripheral wall.

(12) The disc cartridge according to any of (1), (4), (9), (10) and (11), wherein a lower shell reinforcing member is integrally provided in an inner surface of the lower shell to integrally continue both ends of the lower shell opening, in such a manner as to be adjacent in parallel to the reinforcing member in a disc radial direction and be superposed on the reinforcing member in a disc thickness direction.

BEST MODE FOR CARRYING OUT THE INVENTION

An embodiment of the present invention will be hereinafter described in detail with reference to the drawings.

Figure 1:
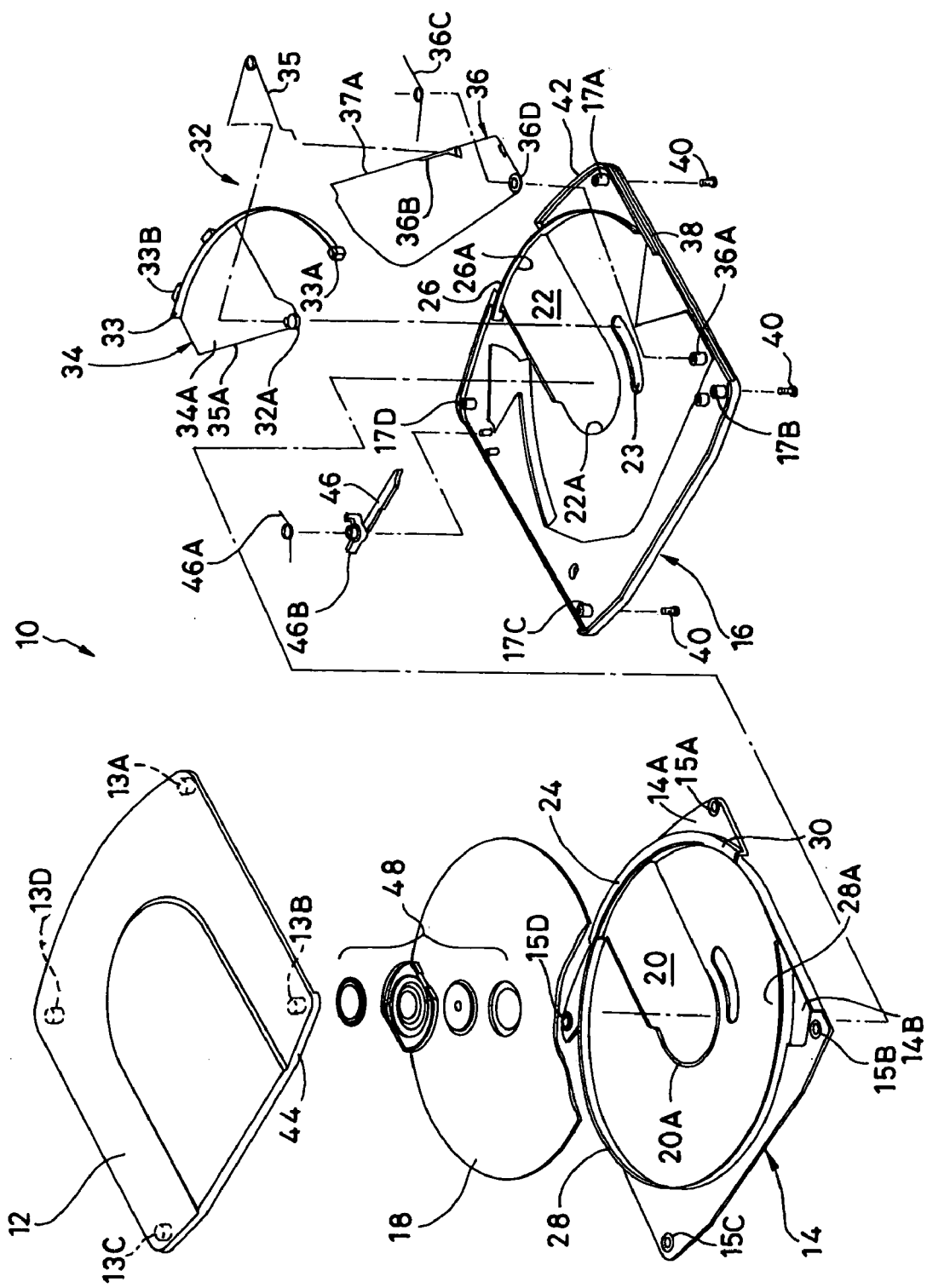
FIG. 1 is an exploded perspective view of a disc cartridge according to one embodiment of the present invention.

A disc cartridge 10 according to this embodiment, as shown in FIG. 1, comprises an upper shell 12, a center frame 14, and a lower shell 16 which are superposed on and coupled to one another in a thickness direction, and a disc recording medium 18 is rotatably contained between the upper shell 12 and the center frame 14.

Figure 2:
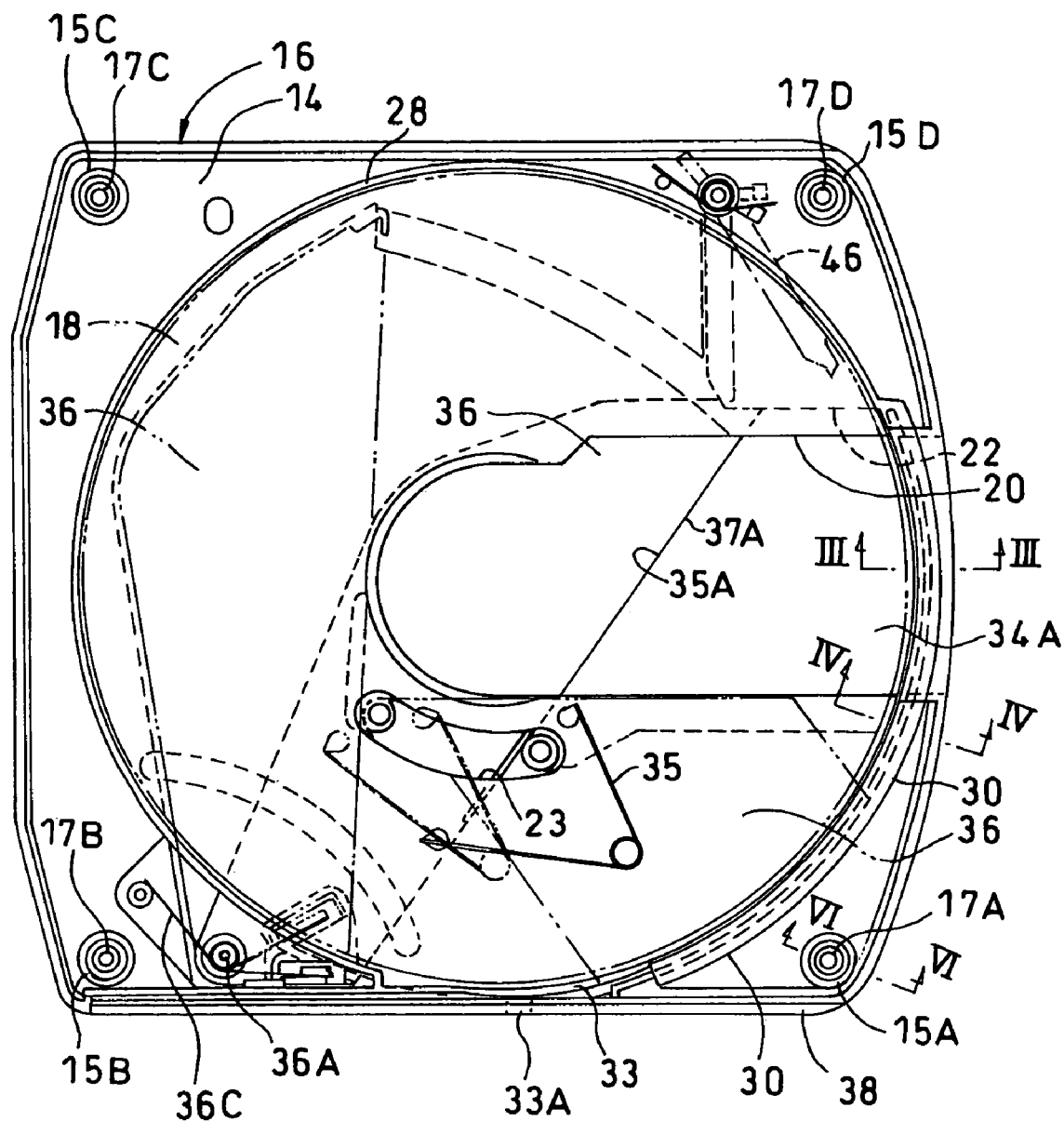
FIG. 2 is a plan view showing a lower shell and a center frame of the disc cartridge which are superposed on each other.

A center frame opening 20 and a lower shell opening 22 for recording and/or reproducing are formed in the almost same shape in the overlap positions of the center frame 14 and the lower shell 16, respectively, in such a manner as to expose a part of signal recording area of the contained disc recording medium 18 across inner and outer peripheries in the disc radial direction, and on a lower surface side of FIG. 1 in the disc thickness direction (refer to FIG. 2). The center frame 14 is provided with a reinforcing member 24 which couples both sides of the outer peripheral edge of the center frame opening 20.

The lower shell 16 is also provided with a lower shell reinforcing member 26 which couples both sides of the outer peripheral edge of the lower shell opening 22.

The center frame 14 has an arc-shaped peripheral wall 28 erected from the upper surface of FIG. 1 in the thickness direction, and a disc container space 28A for containing the disc recording medium 18 is formed inside thereof. The reinforcing member 24 takes the shape of an arc continued from the peripheral wall 28.

The arc-shaped peripheral wall 28 ends in the outer peripheral edge of the center frame opening 20, but the reinforcing member 24 integrally connects between them, so the peripheral wall 28 and the reinforcing member 24 form a ring shape on the whole.

Figure 3:
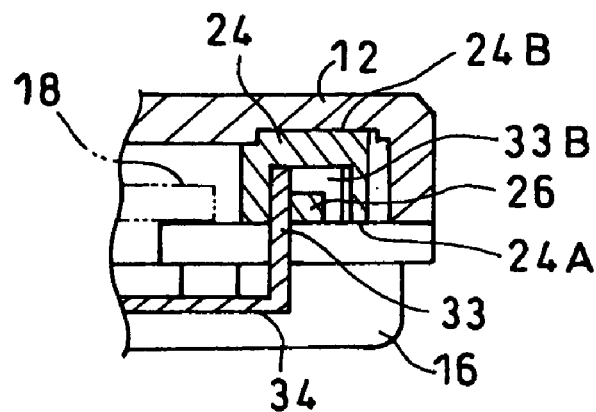
FIG. 3 is an enlarged sectional view taken along the line III—III in FIG. 2.

The bottom surface 24A of the reinforcing member 24, as shown in FIG. 3, separates upward from the lower surface of the contained disc recording medium 18, so that a recording and reproducing mechanism (not illustrated) having a pickup portion and the like in a drive unit (not illustrated) does not interfere when the disc cartridge 10 is installed in the drive unit. The top surface 24B is slightly higher than the upper end of the peripheral wall 28, as shown in FIG. 1.

Figure 4:
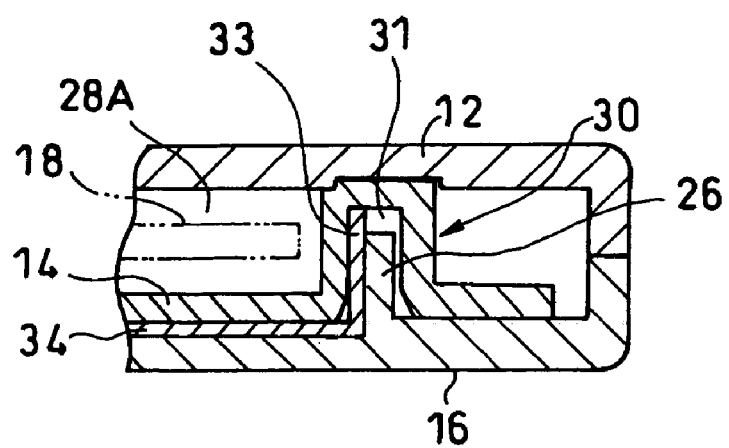
FIG. 4 is an enlarged sectional view taken along the line IV—IV in FIG. 2.

The reinforcing member 24, as shown in FIGS. 1 and 2, extends on both sides in the width direction of the center frame opening 20, and this extended portion, as enlarged and shown in FIG. 4, composes an inverted U-shaped guide channel 30, which opens in the direction of the lower shell 16 and has a guide groove 31 inside thereof, with the peripheral wall 28.

The reinforcing member 24 is in the shape that the lower side of the inverted U-shaped guide channel 30 is cut away in the range of the center frame opening 20, and as enlarged and shown in FIG. 3, the cross section of the reinforcing member 24 is in the inverted U-shape lower than that of the guide channel 30.

The guide groove 31 of the guide channel 30 has such a width that the lower shell reinforcing member 26 and an erected sliding portion 33 of a shutter 32 (details of both are described later) which are superposed on each other are slidably fitted therein.

The lower shell reinforcing member 26 of the lower shell 16 takes an arc shape so as to be fitted into the guide groove 31 in the range of the guide channel 30, and is extended from the both sides of the lower shell opening 22.

As in the case of the reinforcing member 24, the lower side of the lower shell reinforcing member 26 is cut away in the range of the lower shell opening 22 in a width direction, and a bottom surface 26A is flush with the bottom surface 24A of the reinforcing member 24.

Thus, when the disc cartridge 10 is installed in the drive unit, the bottom surfaces 24A and 26A of the reinforcing member 24 and the lower shell reinforcing member 26 are positioned upwardly in FIG. 1 from the recording and reproducing mechanism having the pickup portion and the like in the drive unit, in order to prevent interference with it.

The deep recesses portions of the center frame opening 20 and the lower shell opening 22 are semicircle drive openings 20A and 22A, so that a spindle (not illustrated) which is fitted into the center of the disc recording medium 18 to drive it can enter therein.

The center frame opening 20 and the lower shell opening 22 have similar figures, and when the upper shell 12, the center frame 14, and the lower shell 16 are superposed on one another, as shown in FIG. 2, the width of the center frame opening 20 is slightly larger than that of the lower shell opening 22.

The shutter 32, as shown in FIGS. 1 and 3, comprises a first shutter member 34 and a second shutter member 36.

The first shutter member 34 has an approximately sector shaped shutter blade 34A and the aforementioned erected sliding portion 33 which is perpendicularly erected from the arc-shaped outer periphery of the sector.

Figure 5:
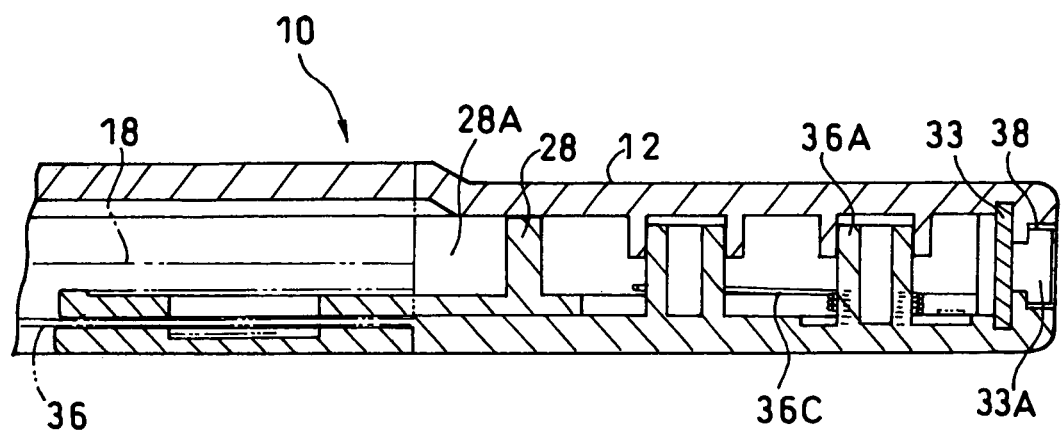
FIG. 5 is an enlarged sectional view of the disc cartridge.

The erected sliding portion 33, which is slightly longer than the guide channel 30, extends along and in parallel with the guide channel 30 and the lower shell reinforcing member 26. A slider 33A is attached in one end of the erected sliding portion 33 opposite to the lower shell opening 22. The slider 33A, as shown in FIGS. 2 and 5, protrudes into a slide groove 38 formed in the sidewall of the disc cartridge 10 in an assembly state, and is held slidably along the slide groove 38. The slide groove 38 is formed in the direction of insertion and ejection of the disc cartridge 10 into and from the drive unit.

A plurality of hooks 33B for slidably hooking the upper end of the lower shell reinforcing member 26 are formed in the upper end of the erected sliding portion 33, so that the first shutter member 34, caught between the reinforcing member 24 and the lower shell reinforcing member 26, is slidable in an arc shape in the guide groove 31 of the guide channel 30.

In the first shutter member 34, a slide pin 32A is attached to the end (a pivot of the sector) of the sector-shaped shutter blade 34A, and the slide pin 32A is slidably fitted into a long opening 23 formed in an arc shape concentrically with respect to the drive opening 22A, so as to slide from one end to the other end of the long opening 23 when the first shutter member 34 is guided in an arc shape in the guide groove 31.

In FIG. 2, when the erected sliding portion 33 reaches a stroke end in a counterclockwise direction, the first shutter member 34 closes the center frame opening 20 and the lower shell opening 22 by approximately half, and when the erected sliding portion 33 closes a notch on the lower side of the reinforcing member 24 and reaches the other stroke end in a clockwise direction, the shutter blade 34A is evacuated so as not to overlap with the center frame opening 20 and the lower shell opening 22, as shown in a chain double-dashed line in FIG. 2, and the erected sliding portion 33 opens the lower side of the reinforcing member 24.

The second shutter member 36, on the other hand, is held in the vicinity of the slide groove 38 movably with respect to a pivot 36A which is on the outside of the peripheral wall 28, and when the second shutter member 36 swings in a clockwise direction of the drawing, the linear edge 37A makes contact with the linear edge 35A of the shutter blade 34A in parallel, which closes the center frame opening 20 and the lower shell opening 22 by approximately half, in order to close the remaining halves of the center frame opening 20 and the lower shell opening 22 under this condition.

When swinging in a counterclockwise direction with respect to the pivot 36A, the second shutter member 36 is evacuated in such a position as not to overlap with the center frame opening 20 and the lower shell opening 22.

The slide pin 32A of the first shutter member 34 makes contact with the linear edge 37A of the second shutter member 36 on the side of making contact with the first shutter member 34, and is slidable on it.

In the second shutter member 36, a reinforcing sliding portion 36B for a smooth slide is integrally attached to the contact portion of the linear edge 37A with the slide pin 32A.

The second shutter member 36, as shown in FIG. 5, is biased in a contact direction with the first shutter member 34 by a helical torsion coil spring 36C fitted onto the pivot 36A.

A helical torsion coil spring 35 fitted between the first shutter member 34 and the second shutter member 36 invariably biases them in the direction separate from each other.

According to the above structure, when the disc cartridge 10 is installed in the drive unit and the slider 33A pulled leftward of FIG. 2 moves by predetermined distance along the slide groove 38, the first shutter member 34 swings clockwise in the drawing in the arc shape along the guide groove 31, and then, the slide pin 32A similarly slides clockwise in the long opening 23. Depending on the type of device, the shutter may be closed when the slider 33A is pulled as described above.

A slide of the slide pin 32A in the clockwise direction makes the second shutter member 36 swing counterclockwise around the pivot 36A against the bias of the helical torsion coil spring 36C, and hence the center frame opening 20 and the lower shell opening 22 are opened.

Upon taking the disc cartridge 10 out of the drive unit, the helical torsion coil springs 35 and 36C return the first and second shutter members 34 and 36 to positions illustrated by solid lines, to close the center frame opening 20 and the lower shell opening 22.

Then, the clamping fixation structure of the upper shell 12, the center frame 14, and the lower shell 16 will be hereinafter described.

Figure 6:
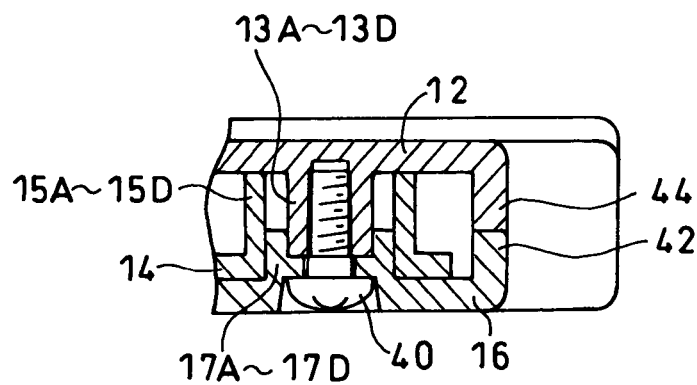
FIG. 6 is an enlarged sectional view taken along the line VI—VI in FIG. 2.

Referring to FIG. 1, bosses 17A, 17B, 17C, and 17D are erectly provided in the four corners of the inner surface (the upper surface of FIG. 1) of the lower shell 16, and inserted bosses 15A, 15B, 15C and 15D into which the bosses 17A to 17D are inserted are provided in the center frame 14, and as shown in FIG. 6, the center frame 14 is put above the lower shell 16 in such a manner as to fit the inserted bosses 15A to 15D onto the corresponding bosses 17A to 17D, in order to fix the position thereof with respect to the lower shell 16.

In the upper shell 12, on the other hand, receiver bosses 13A, 13B, 13C, and 13D, which pierce the center frame 14 and are fitted into the bosses 17A to 17D protruding upward in FIG. 1, are formed downwardly in FIG. 1. At this time, in FIG. 6, the upper ends of the inserted bosses 15A to 15D make contact with the lower surface of the upper shell 12.

In the center frame 14, the inserted bosses 15A to 15D are formed in a planar rib 14A continuously and integrally extending to the outside from the peripheral wall 28 and the guide channel 30.

The rib 14A is provided with a notch 14B which prevents interference with pivot 36A provided in the inner surface of the lower shell 16 in assembly process.

Tapping screws 40 are fastened from underneath of the bosses 17A to 17D, in other words, from the outside of the lower shell 16, to the receiver bosses 13A to 13D, under conditions that the bosses 17A to 17D are inserted into the inserted bosses 15A to 15D and are fitted over the receiver bosses 13A to 13D, to clamp the inserted bosses 15A to 15D between them, and hence the lower shell 16, the center frame 14, and the upper shell 12 are integrally clamped.

In this clamping condition, as described above, the lower shell reinforcing member 26 is fitted into the guide channel 30, downward in the drawing, of the center frame 14, and the erected sliding portion 33 of the first shutter member is slidably held between the inner surface thereof and the outer surface of the guide groove 31 of the guide channel 30.

In the above clamping structure of the upper shell 12, the center frame 14, and the lower shell 16, the outer periphery of the center frame 14 has such a size and shape as to be fitted into the lower shell outer wall 42 of the lower shell 16, and the upper shell 12 has an upper shell outer wall 44 which is opposed to the upper end of the lower shell outer wall 42 of the lower shell 16, so that the lower shell outer wall 42 and the upper shell outer wall 44 make tightly contact with each other, when integrally clamped by the tapping screws 40.

As described above, the upper end surfaces of the peripheral wall 28 and the reinforcing member 24 in the center frame 14 makes tightly contact with the back surface (inner surface) of the upper shell 12, when the upper shell 12 is clamped on the lower shell 16.

The above parts are formed in such sizes that when the upper shell 12 is clamped on the lower shell 16 by the tapping screws 40, the peripheral wall 28 of the center frame 14 makes contact with the inner surface of the upper shell 12, then the upper shell outer wall 44 makes contact with the lower shell outer wall 42, and then the inserted bosses 15A to 15D make contact with the inner surface of the upper shell 12.

Therefore, even if the upper shell 12 is tightly clamped on the lower shell 16 by the tapping screws 40, since the clamping force disperses to the contact portion between the lower shell outer wall 42 and the upper shell outer wall 44, the peripheral wall 28 of the center frame 14, the reinforcing member 24, and the back surface of the upper shell 12, concentrated load does not occur in the positions of the tapping screws 40, so that it is possible to prevent distortion in the upper shell 12 and the lower shell 16.

The upper shell 12 composing the disc cartridge 10 is made of material with high heat resistance and high stiffness, that is, for example, resin such as PC (polycarbonate), ABS or the like with reinforcing materials such as glass fiber or the like, magnesium alloy or the like, but, while on the contrary, the lower shell 16 is made of material with low sliding frictional resistance such as resin or the like, though heat resistance and stiffness of which are lower than those of the upper shell 12.

This is because the following reasons. To form the whole cartridge 10 thin, and provide parts such as the shutter and the like therein, it is necessary to form the outer surface of the cartridge 10 almost even, while the thickness of the lower shell 16 and the center frame 14 is partially varied in accordance with the installation positions and the slidable range of the parts.

As a result, it is necessary to form portions the thickness of which are extremely thin, so that stiffness of the lower shell 16 and the center frame 14 decreases irrespective of the type of material.

Since the resin with reinforcing materials such as glass fiber and the like is bad at moldability in the thin portions, flatness in a molded product tends to decrease and frictional resistance tends to increase, so that it is difficult to use resin for the lower shell 16 and the center frame 14.

Moreover, it is possible to use magnesium alloy, aluminum or the like which has higher stiffness and heat resistance than resin, but when these materials are used for the lower shell and the center frame of the cartridge which have constraints on shape, as described above, these materials are generally inferior to resin in terms of moldability and cost, and are unsuitable for the slide of internal parts because of a high coefficient of friction and a high surface hardness.

Especially for the center frame which directly makes contact with the disc recording medium, it is not preferable to make the center frame of metal because there is a fear that the metal center frame damages the disc recording medium which is made of resin.

At least the upper shell of the whole disc cartridge 10, on the other hand, has to be made of material with high stiffness and heat resistance to maintain stiffness of the whole.

The upper shell 12 has a high degree of flexibility in shape as compared with the center frame 14 and the lower shell 16, because of its simple structure without a shutter mechanism, space left outside a disc break mechanism 48 (described later) and the like, so that it is possible to thicken the thickness of the main surface thereof and to increase stiffness by providing a reinforcing rib inside thereof.

The reference numeral 46 in FIGS. 1 and 2 designates a shutter lever which keeps the second shutter member 36 closed, and keeps the first shutter member 34 closed via the second shutter member 36. When the disc cartridge 10 is not installed in the drive unit, an end of the shutter lever 46 holds an end surface of the closed second shutter member 36 by a spring 46A to prevent the first and second shutter members 34 and 36 from opening. Upon installing the disc cartridge 10 in the drive unit, an outer end 46B of the shutter lever 46 which protrudes from the side face of the disc cartridge 10 is pressed by a member in the drive unit (not illustrated) and swings counterclockwise in the drawing, to make the second shutter member 36 swing to an open direction.

The reference numeral 48 in FIG. 1 designates the disc break mechanism which prevents recording medium 18 on the disc from rotating when the disc cartridge 10 is taken out of the drive unit.

In the disc cartridge 10 according to this embodiment, especially, since the reinforcing member 24 integrally couples both sides of the outer peripheral edge of the center frame opening 20 to increase stiffness, flatness does not decrease due to warpage which occurs in molding. Therefore, the margin of the disc container space 28A for containing the disc recording medium 10 is secured because warpage, distortion, and the like are prevented.

Furthermore, since the reinforcing member 24 and the peripheral wall 28 continued therefrom are made into the guide channel 30, and the guide groove 31 for guiding the shutter member is provided in the guide channel 30, the shutter member is securely opened and closed along an arc track, so that it is possible to securely open and close the shutter member made of material which has low stiffness though has low friction, for example, resin or the like.

The reinforcing member 24 is in the shape of shallow inverted U without the lower portion of the guide channel 30, but the present invention is not limited thereto, the reinforcing member 24 may be in an L shape as long as the reinforcing member 24 can maintain equal to or more than a predetermined amount of stiffness.

Furthermore, since the guide channel 30 continued from the reinforcing member 24 receives the lower shell reinforcing member 26 of the lower shell 16 positioned below, the guide channel 30 becomes the reference of alignment of the upper shell 12, the center frame 14, and the lower shell 16 in assembling them into one body, and stiffness of the assembled disc cartridge 10 increases.

INDUSTRIAL APPLICABILITY

The present invention, structured as described above, has outstanding effect that increases strength and moldability of the disc cartridge, and prevents warpage thereof.

Even if the disc cartridge has the center frame between the upper and lower shells, there is effect that distortion is prevented on the whole without concentrated load to tapping portions, and the slide of the shutter and the like is not disturbed.

The invention claimed is:

1. A disc cartridge comprising an upper shell, a center frame, and a lower shell superposed on and coupled to each other in a thickness direction, wherein a disc container space between said upper shell and said center frame rotatably contains a disc recording medium, a center frame opening and a lower shell opening for recording and/or reproducing are formed in the approximately same shape at overlapping positions of said center frame and said lower shell, respectively, to expose a part of a signal recording area of said contained disc recording medium across inner and outer peripheries in a disc radial direction and to the outside of said lower shell in a disc thickness direction, and a reinforcing member is integrally provided in said center frame to couple both sides of said center frame opening, in a position separate from a surface of said contained disc recording medium on a lower shell side to an upper shell side in the thickness direction, an arc-shaped disc outer peripheral wall is erectly formed in a surface of said center frame on an upper shell side, and said reinforcing member is formed in an arc shape so as to be continued from said disc outer peripheral wall, wherein a shutter for opening and closing said center frame opening and said lower shell opening is movably contained between said center frame and said lower shell along a plane opposed to said center frame and said lower shell, and said disc outer peripheral wall and said reinforcing member function as a guide for said shutter.

2. The disc cartridge according to claim 1, wherein a lower shell reinforcing member is integrally provided in an inner surface of said lower shell to integrally continue both ends of said lower shell opening, in such a manner as to be adjacent in parallel to said reinforcing member of said center frame in a disc radial direction and be superposed on said reinforcing member of said center frame in a disc thickness direction.

3. A disc cartridge comprising an upper shell, a center frame, and a lower shell superposed on and coupled to each other in a thickness direction, wherein a disc container space between said upper shell and said center frame rotatably contains a disc recording medium, a center frame opening and a lower shell opening for recording and/or reproducing are formed in the approximately same shape at overlapping positions of said center frame and said lower shell, respectively, to expose a part of a signal recording area of said contained disc recording medium across inner and outer peripheries in a disc radial direction and to an outside of said lower shell in a disc thickness direction, at least an inner surface of said lower shell is made of material with low slide frictional resistance, and said upper shell is made of material having higher heat resistance and stiffness than material for the inner surface of said lower shell.

4. The disc cartridge according to claim 3, wherein a reinforcing member is integrally provided in said center frame to couple both sides of said center frame opening in an outer edge of said center frame opening, and in a position separate from a surface of said contained disc recording medium on a lower shell side to an upper shell side in the thickness direction.

* * * * *